United States Patent
Chen

(10) Patent No.: US 7,089,377 B1
(45) Date of Patent: Aug. 8, 2006

(54) VIRTUALIZATION SYSTEM FOR COMPUTERS WITH A REGION-BASED MEMORY ARCHITECTURE

(75) Inventor: Xiaoxin Chen, Fremont, CA (US)

(73) Assignee: VMWare, Inc., Palo Alto, CA (US)

( * ) Notice: Subject to any disclaimer, the term of this patent is extended or adjusted under 35 U.S.C. 154(b) by 547 days.

(21) Appl. No.: 10/236,245

(22) Filed: Sep. 6, 2002

(51) Int. Cl.
*G06F 12/00* (2006.01)
*G06F 9/455* (2006.01)

(52) U.S. Cl. .............. 711/147; 711/138; 711/152; 703/27

(58) Field of Classification Search ............ None
See application file for complete search history.

(56) References Cited

U.S. PATENT DOCUMENTS 6,075,938 A * 6/2000 Bugnion et al. ............ 703/27
2003/0084256 A1* 5/2003 McKee ....................... 711/152
2003/0115578 A1* 6/2003 Liokumovich et al. ..... 717/138

* cited by examiner

*Primary Examiner*—Mano Padmanabhan
*Assistant Examiner*—Duc T Doan
(74) *Attorney, Agent, or Firm*—Jeffrey Pearce

(57) ABSTRACT

In a computer system with a non-segmented, region-based memory architecture, such as Intel IA-64 systems, two or more sub-systems share a resource, such as a virtual-to-physical address mapping and need to have overlapping regions of the virtual address space for accessing different physical addresses. Virtual addresses include a portion that is used to identify which region the issuing sub-system wants to access. For example, the region-identifying portion of virtual addresses may select a region register whose contents point to a virtual-to-physical address mapping for the corresponding region. To protect a second sub-system S2 from a first S1, whenever the S1 issues an address in a region occupied by S2, the region for the S2 is changed. This allows S1 to issue its addresses without change. In a preferred embodiment of the invention, S2 is a virtual machine monitor (VMM) and S1 is a virtual machine running on the VMM.

20 Claims, 6 Drawing Sheets

VIRTUALIZATION SYSTEM FOR COMPUTERS WITH A REGION-BASED MEMORY ARCHITECTURE

BACKGROUND OF THE INVENTION

1. Field of the Invention

This invention relates to the field of computer virtualization, that is, to systems and methods for implementing computers as software running on an underlying host hardware platform.

2. Description of the Related Art

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit MMU 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system OS 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 302 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 302 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity; in many installations, there will be more than one VM installed to run on the common hardware platform; all will have essentially the same general structure, although the individual components need not be identical.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54–45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

FIG. 2 illustrates yet other implementation, in which the kernel 700 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

Memory Mapping and Address Terminology

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VA-to-PA mappings entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. The OS thus specifies the mapping, but the hardware MMU 108 usually actually performs the conversion of one type of page number to the other. Below, for the sake of simplicity, when it is stated that a software module "maps" pages numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579–603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 302 then translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 302 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "PPNs," respectively, where "PPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system, and the host OS need not maintain a GVPN→GPPN mapping.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, an application 360 written in a language such as Visual Basic might be running in the VM, whose guest OS may be compiled from different language, whereas the VMM itself might be a program written in C.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the application VMapp 500, which then issues calls to the driver VMdrv 242, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

In addition to exporting device emulations to the VM, translating some VM instructions to avoid privilege violations, handling its interrupts, etc., the VMM may also maintain data structures such as shadow page tables that the VM must not be allowed to alter. It is therefore important to make sure that the VM does not access and alter the portion of memory in which the VMM is contained. One way to solve this problem is simply to prevent the VM from accessing the VMM's memory space using known methods. This "brute force" solution, however, might generate a large number of traps and faults and seriously degrade the VM's performance.

Another way to prevent this is simply to locate the VMM in a memory space that cannot be addressed by the VM. In systems with the 32-bit Intel IA-32, segmented memory architecture, this can be done using segment registers and descriptors to locate the VM and VMM in non-intersecting virtual address spaces. This approach is not possible, however, for the next generation processor architectures such as the non-segmented, 64-bit Intel IA-64 architecture, in which the VM and VMM must share the same virtual address space.

What is needed is therefore a mechanism that retains the advantages of virtualization described above, but that functions efficiently in the IA-64, or other non-segmented, environment. The mechanism should also be possible to extend to the more general case where there are two systems (neither or which is necessarily virtualized) that need to share a resource (such as a common virtual address space) or access a hardware translation (such as a profiler, which is usually also accessed with address translation) at the same time, etc., but where the two systems must be protected from each other. This invention provides such a mechanism.

SUMMARY OF THE INVENTION

A computer system has at least two sub-systems that share a resource, access to which is through addressing a non-segmented address space that is divided into regions. When a first one of the sub-systems (S1) attempts to access a region currently occupied by a second one of the subsystems (S2), S2 is relocated to a different region. S1 may then directly address the region that was occupied by S2 before S2 was relocated.

In the preferred embodiment of the invention, the resource is physical memory that has a physical address space. The physical memory is accessed by addressing a virtual address space, with virtual addresses being converted to physical addresses. The virtual address space is divided into the regions, and each virtual address includes a region-identifying portion, such as the virtual region number (VRN) used in the Intel IA-64 architecture. The step of relocating S2 to a different region comprises changing the region-identifying portion of addresses issued by S2.

Also in the preferred embodiment of the invention, the region-identifying portion of each virtual address points to one of a set of region registers. The contents of each region register in use is a region identifier (RID) that points into a virtual-to-physical address map, such as a translation look-aside buffer (TLB). The step of relocating S2 to a different region further comprises loading into a different region register the region identifier pointing to the mapping in the virtual-to-physical address map corresponding to the virtual region of S2 and changing the region-identifying portion of addresses issued by S2 to point to the different region register.

Preferably, all but critical instructions of S2 are coded using relocatable code defined relative to an address base. The step of changing the region-identifying portion of addresses issued by S2 can then be accomplished by changing the address base to be the beginning of a region.

In the preferred embodiment of the invention, S2 is a virtual machine monitor and S1 is a virtual machine running on the VMM.

Entries in the virtual-to-physical address map corresponding to S2's region are preferably set to a higher privilege level than the privilege level of entries corresponding to any region of S2. Any attempted access by S1 to higher-privilege entries of S2 then causes a fault. S1 then senses attempted addressing by S1 of the region currently occupied by S2 by detecting the fault, preferably by using an interrupt handler in S2. S2 then relocates to a different region when S2 detects the fault, before S1 alters its own state.

In the preferred embodiment of the invention, the computer system has an Intel 64-bit architecture.

Another example of a resource that may be efficiently shared using the invention is a profiler.

DETAILED DESCRIPTION

Figure 1:
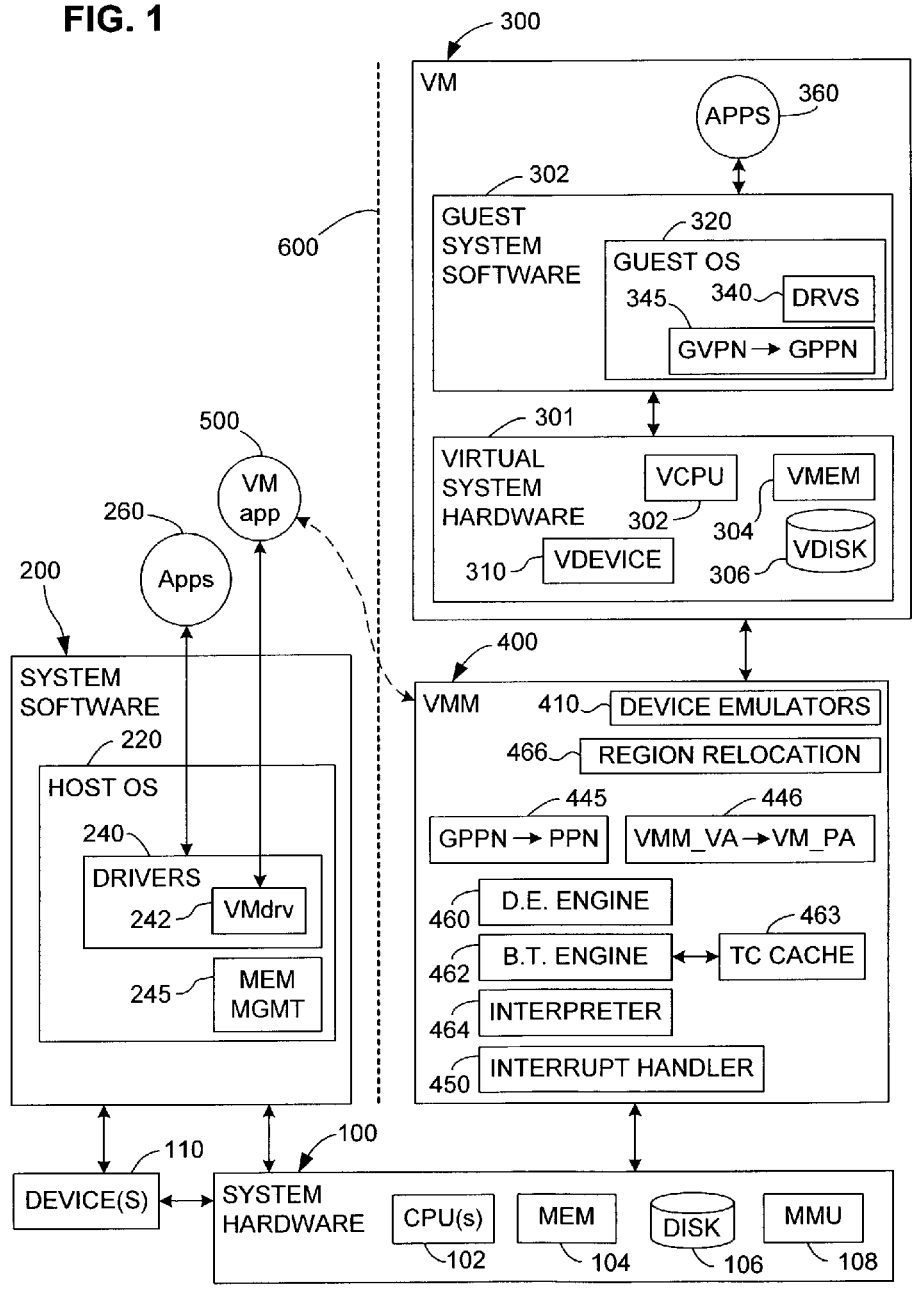
FIG. 1 illustrates a virtual computer system installed on a host platform, with a virtual machine monitor (VMM) at the same system level as the host operating system.
Figure 2:
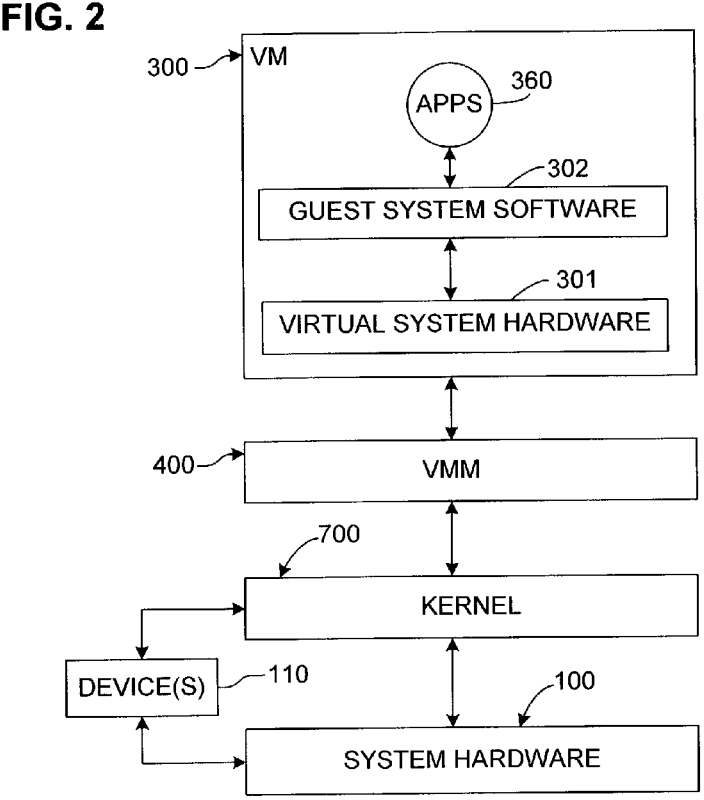
FIG. 2 illustrates an alternative configuration of a virtual computer system, which includes a kernel on which the VMM runs.

In broadest terms, the invention involves a mechanism that allows two or more sub-systems to share without conflict a common hardware resource or access a hardware translation (for example a profiler) at the same time. In the preferred embodiment of the invention described below, the shared resource is a non-segmented virtual address space, in particular, virtual-to-physical address mapping. The mechanism according to the invention protects a second one of the sub-systems from a first one by preventing the first sub-system from accessing the virtual address space of the second: The mapping of the first sub-system is allowed to precede the mapping of the second sub-system, but when this happens the second sub-system changes to another virtual address to access the same physical address.

In the preferred embodiment of the invention, the first sub-system is a virtual machine (VM) and the second sub-system is a virtual machine monitor (VMM), which forms the interface between the VM and the underlying host hardware and software. The invention is described in the context of the 64-bit Intel IA-64 architecture, since this is the non-segmented architecture that will be used in the next generation of personal computers and servers. The techniques of the invention will work with other architectures whose memory space is partitioned into "regions" that are separated using an IA-64-like scheme. The applicability of the invention to other architectures will be apparent to those knowledgeable of modern operating systems.

One assumption that is not necessary to the invention, but that highlights its usefulness, is that the first sub-system should be given "preference" when it comes to memory access in the sense that its attempts to access the shared virtual address space should be made as direct and fast as possible. In the preferred context of virtualization, the invention helps prevent a VM from accessing the memory region used for the VMM, while still allowing the VM to maximize the time it can spend in direct execution. At the same time, the VMM code and data, including tables, etc., are maintained in a dedicated region protected from the VM. These concepts and the techniques that make them possible are explained below.

IA-64 Memory Architecture

To better understand the preferred embodiment of the invention, it helps to keep in mind the main addressing conventions of the Intel IA-64 architecture. The key distinction between this architecture and the 32-bit, IA-32 architecture is that the IA-64 memory space is non-segmented, but is divided into regions. Note that the term "segment" is also used in descriptions of the Intel IA-64, but not in the same sense as in segmented architectures. In a segmented memory architecture such as the IA-32, memory access is controlled using segment registers and various tables of segment "descriptors" that may be loaded into the registers. The main tables are the Local Descriptor Table (LDT) and the Global Descriptor Table (GDT). A VM running on this architecture will maintain similar tables for its virtual processor; thus, the VM will have a virtual LDT and a virtual GDT. The VMM may maintain shadow copies of these virtual descriptor tables to help ensure coherency and to increase security. Segmentation in the IA-32 (or earlier) context is thus related to hardware segment registers.

The Intel "IA-64 Software Conventions and Runtime Architecture Guide," September 2000, defines the difference between segments and regions in the IA-64 context:

Segment: An area of memory that has specific attributes and behaves as a fixed unit at runtime. All items within a segment have a fixed address relationship to one another at execution time, and have a common set of attributes. Items in different segments do not necessarily bear this relationship, and an application may not depend on one . . . The use of this term is not related to the concept of a segment in the IA-32 architecture, nor is it directly related to the concept of a segment in an object file.

Region: The IA-64 architecture divides the address space into four or eight regions. In general, the runtime architecture is independent of which segments are assigned to which regions.

The IA-64 system has the property that it can map virtual memory regions differently, and can change the mapping, but the mapping granularity is always a whole region. The invention operates at the level of regions.

By definition, if addresses are 64 bits wide, then there are $2^{64}$ possible addresses, which comprise the entire theoretical virtual address space of the memory. No hardware memory could ever hold $2^{64}$ bytes (words, etc.), however, so the host OS and/or hardware memory management mechanisms map whatever subset of the $2^{64}$ possible memory addresses that is allocated for use by applications to physical memory.

Figure 3:
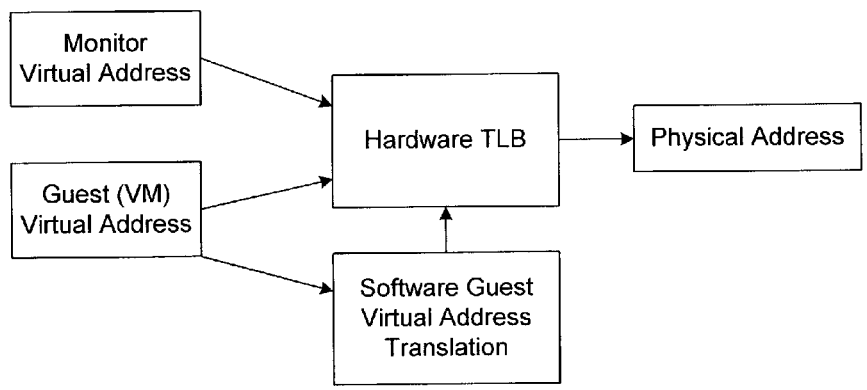
FIG. 3 illustrates memory access by a virtual machine (VM) and VMM.

FIG. 3 illustrates how the VMM and VM access memory from the perspective of the host OS. Note that the host OS will view the VMM and VM as applications and thus considers their addresses both to be "virtual," which are converted into "physical" addresses, following conventional terminology. As is mentioned above, virtualization introduces an additional level of addressing indirection, such that the "physical" addresses (GPAs) issued by the VM guest must be converted into hardware addresses (PAs). In virtualized systems in which the VMM is at the same system level as the host OS, the VMM itself can perform virtual-to-physical address translation or address directly the hardware structures such as the TLB used to translate addresses.

As FIG. 3 shows, when an instruction in the monitor virtual address space accesses guest memory, the hardware must get the physical (hardware) address for the instruction and the physical (hardware) address of the guest memory. This is accomplished by translating the monitor and guest virtual addresses into their corresponding physical addresses. This means that the VMM's virtual addresses coexist with the guest's (VM's) virtual addresses in the same virtual address space.

Figure 4:
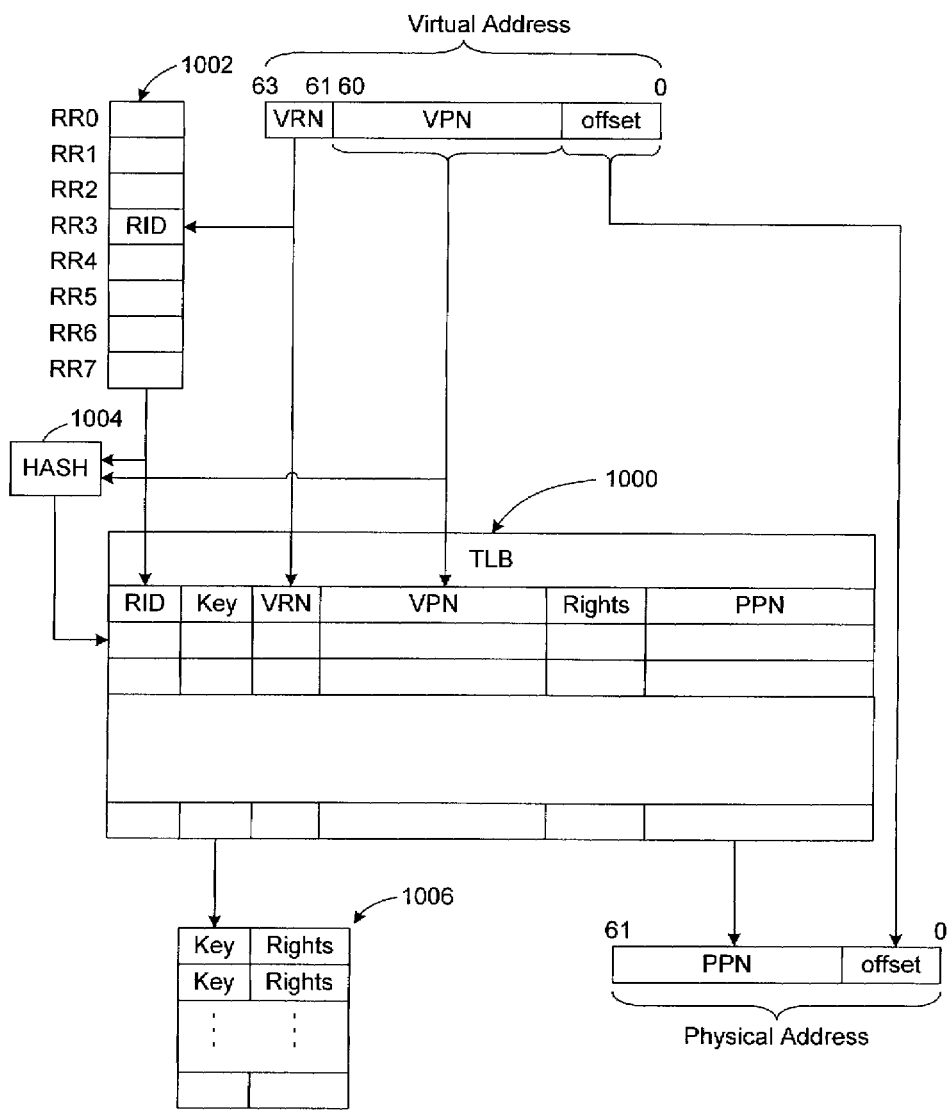
FIG. 4 illustrates various structures used to translate virtual addresses into physical addresses in the Intel IA-64 architecture.

FIG. 4, which is adapted from Intel Corp.'s "IA-64 Architecture Software Developer's Manual", Vol. 2, "Addressing and Protection," Rev. 1.0, January 2000, illustrates how virtual addresses are translated into physical addresses in a standard IA-64 system: Each virtual address includes a virtual region number (VRN), indicated using the three MSBs of the address, a virtual page number (VPN) and an offset. The VRN is used both to search a corresponding field in the entries of a translation lookaside buffer (TLB) 1000 and also to point into a set (RR0, RR1, . . . , RR7) of region registers 1002, each of which contains a 24-bit region identifier (RID).

To translate a virtual address into a physical address, the TLB 1000 matches both the RID obtained from the RR of the VRN and the VPN with entries in the TLB. If a matching entry is found, the entry's physical page number (PPN) is concatenated with the page offset of the virtual address to form the physical address. Besides fields used for virtual address translation, the TLB entry also contains access rights and a 24-bit protection key, which is matched against all protection key registers 1006. The memory address translation succeeds only if both the access rights from the TLB entry allow the access and a matching protection key is found with the required permission bits set.

If an address lookup fails in the TLB, then a conventional virtual hash page table VHPT walker, if enabled, searches for the translation in a virtual hash page table 1004 (VHPT). If a matching entry is found, then the translation is inserted into the TLB and the physical address is obtained. A page table address (PTA) register (not shown, for simplicity, but well known) controls the behavior of the VHPT walker: The PTA includes parameters that contain information (PTA.base) for creating the VHPT base address, for determining whether the VHPT walker is enabled (PTA.ve), and for determining whether the VHPT is in short format or long format (PTA.vf). More detailed information about the PTA's structure and function is available from publicly available manuals from Intel Corp.

Figure 5:
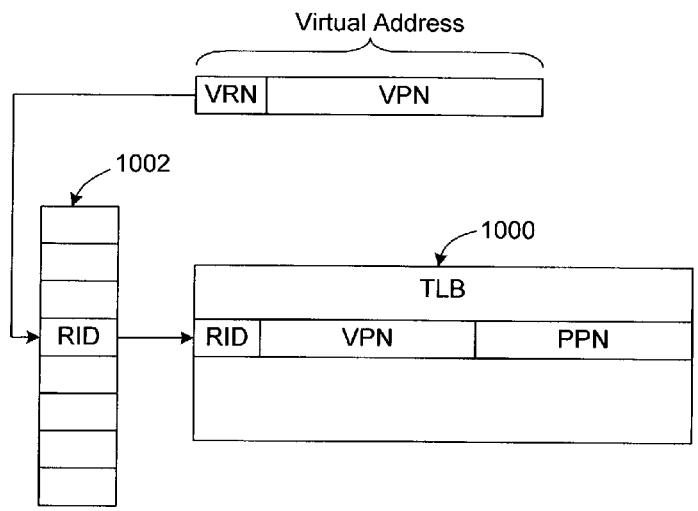
FIG. 5 is a simplified representation of the features of FIG. 4 used in the invention.

FIG. 5 is a simplified version of FIG. 4 that shows the features of virtual address space translation used in the IA-64 that are at the core of the invention: The VRN of the virtual address is used to select one of the region registers 1002, in particular, the register RRn where n=VRN. The region ID (RID) in the selected region register (RR(VRN)) along with the VPN is then used to search the TLB 1000 to find the corresponding PPN. (The offset in the physical address will be the same as in the virtual address.) The RID in RR(VRN) must match that in the hardware TLB. According to the invention, a special RID is assigned to the monitor address space. If RR(VRN) does not contain the monitor RID, then no monitor entries in the hardware TLB will match the virtual address.

Regions and Execution Modes

As mentioned above, the address space of an IA-64 system allows for separate addressing of $2^{64}$ different bytes, since each address contains 64 bits. To manage this address space, the upper (most significant) three bits of each address are used to form the VRN, which designates a $2^{61}$-byte "region." The VM and the VMM are loaded initially in different regions using any known method by the host OS.

Since the monitor occupies one region, the VM can freely access the other seven regions, which comprise $7*2^{61}$ bytes of memory space. Although this memory space is more than big enough to contain any code and data the VM might need, the VM may still attempt to access the address space that is assigned to the VMM. This must be prevented. One way to prevent such "unauthorized" and potentially dangerous access is to set up data structures in the VMM to intercept and emulate any attempted access into the VMM's region using the VMM-mapped address for the original VM address. These additional structures and processing steps introduce a significant overhead, however, so much so that direct execution of the VM instructions is either slowed unacceptably or is ruled out altogether. Moreover, this would asymptotically degrade the VM's performance degradation to the VM as the variety of operating systems and applications increases.

Another approach is to limit the range of the implemented virtual address space, so that the VMM always resides in the memory space that is not defined in the VM. This changes the hardware specification of the VM from the original hardware, however, which may not be suitable for existing and future operating systems software.

This invention provides a different solution, which avoids the drawbacks of the existing or hypothetical approaches mentioned above: According to the invention, the VMM is relocated in the virtual address space as needed so as to allow for as much direct execution of VM instructions as possible.

The VM/VMM pair executes in different modes, each of which involves access to either the VM's memory region, the VMM's current memory region, or both. The three main execution modes are referred to here as the direct execution mode, the binary translation mode, and the monitor mode. If an external interrupt or a fault occurs when the VMM is executing, it preferably saves the interrupted context and enters the monitor mode, in which it will decide to return to the host OS kernel or resume in translation mode or direct execution. The interrupt handler is responsible for swapping the register state and the page table address, so it may be considered to be an additional execution mode.

Figure 6:
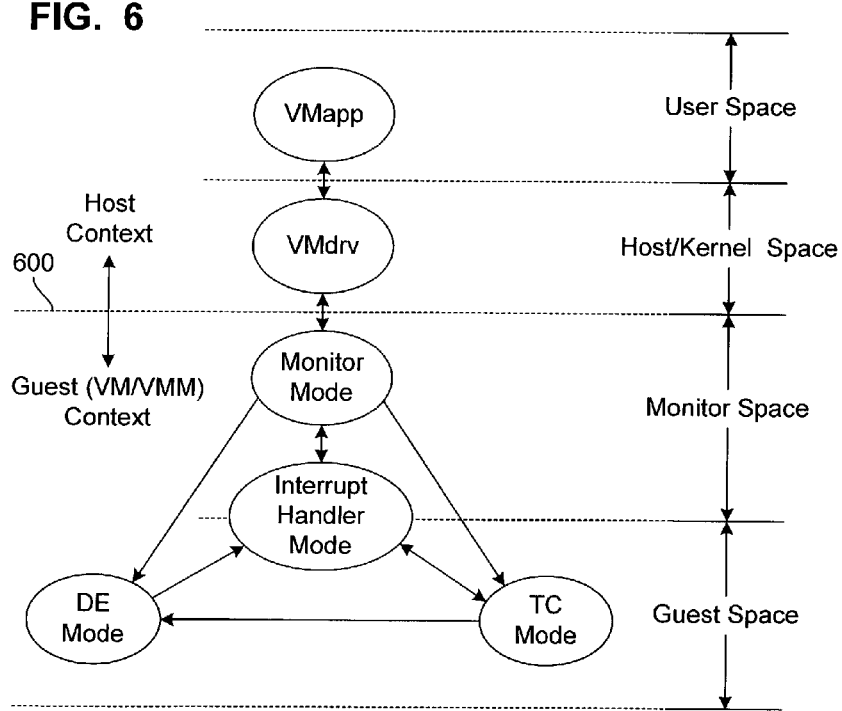
FIG. 6 illustrates state transitions and control flow for a VMM, as well as communication paths between the VMM, on the one hand, and a driver and a user-level application used to communication with a host OS on the other hand as found in a preferred embodiment of the invention.

FIG. 6 illustrates the state transitions of the VMM as well as communication paths with VMdrv and VMapp. The figure also shows the parts of the total memory space in which the different states operate. The contextual line 600 (see FIG. 1) between the host and guest contexts or "worlds" is also shown. As the figure shows, the application VMapp operates in the user-level address space, the driver VMdrv is located in the host/kernel space, execution in the monitor mode takes place within the monitor (VMM) space, direct execution and binary translation take place in the guest (VM) space, and interrupt handling generally requires access to both the VMM and the VM spaces.

VMM Memory Space

The VMM runs in either its own VMM memory space, or in the VM's guest space, and often in both. In the monitor space, the monitor's code and data are directly addressable. The monitor space also contains an area shared with VMapp, as well as the guest physical memory, which, in IA-64 systems, the VMM can access directly.

Figure 7:
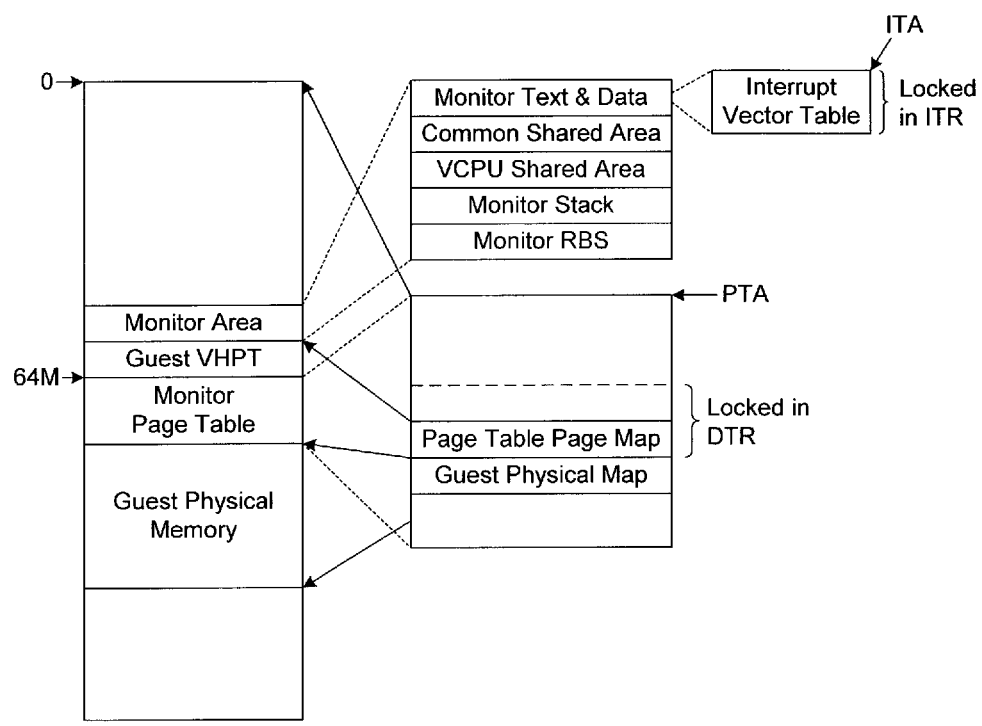
FIG. 7 illustrates one example of the address space of a VMM used in the preferred embodiment of the invention.

FIG. 7 illustrates the VMM address space, which is located in a single virtual address region and is addressed by a short-format Virtual Hash Page Table (VHPT, also referred to here as the VMM or monitor page table). The monitor's virtual address space is divided into the monitor area, a guest VHPT (GVHPT), the monitor page table and guest physical memory areas. FIG. 7 also shows more detailed breakdowns of the monitor area and monitor page table.

The monitor area is accessed mainly when the VMM runs in monitor mode, that is, when the code defining the VMM is being executed. It is therefore further divided into code and data, a common shared area, a VCPU shared area, a stack, and a register backing store (RBS). The interrupt vector table (IVT) is a section of the monitor code, which is pointed to by the hardware ITA and is always locked in an instruction translation register (ITR) of the TLB when VMM is running.

The GVHPT is a long-format VHPT table that serves as a second level TLB table for guest virtual address translations. When running in the direct execution mode, the hardware Page Table Address (PTA) points to the start of the GVHPT. The entries in the GVHPT are shadowed in the guest TLB and guest VHPT tables.

The monitor page table maps all areas accessible to the VMM in a short-format VHPT table. When running in the monitor, the hardware PTA points to the start of the monitor page table. The page that contains translations for the monitor page table and the GVHPT is locked in the data translation register (DTR) of the hardware TLB.

The physical (machine) memory used by the guest is also represented as a continuous virtual address region that maps to the conceptual guest physical memory. Guest physical memory can be directly accessed by adding a constant offset to the guest physical address.

The key point to keep in mind concerning FIGS. 6 and 7 is that the VM and VMM occupy different memory regions, but that the VM can and might access the VMM region because they can both access the same virtual addresses.

The virtual system hardware 301 is assumed to have the same IA-64 (or other non-segmented) architecture as the host; otherwise, direct execution will in general not be possible at all. Also, recall that the VM is intended to act as a complete hardware and software computer system. This means that the structure shown in FIG. 4 is replicated in the VM. The VM will consequently preferably have a guest TLB, protection key registers, region registers, hash table, walkers, etc., just like a "real" computer.

Physical Addressing Virtualization

As is mentioned above, the VMM (monitor) maps the guest (VM) physical memory to the host physical ("machine") memory. The VM (guest) memory is not guaranteed to map to consecutive machine memory; rather it is mapped in page-sized units defined by the host OS. When the VM accesses its guest physical address (GPA), the VMM splits the GPA into a GPPN and an offset. The hardware, physical address PA is then obtained by mapping GPPN→PPN and concatenating the invariant page offset.

Explicit translation is unnecessary when the VMapp and the VMM access the VM memory space. In the VMapp, guest physical memory is allocated using standard host OS commands, so accesses to the guest physical memory can be achieved through standard host OS virtual addressing.

From the perspective of the host OS, both the VM and the VMM occupy a common virtual address space that is divided into regions. The VM, however, acting as a "complete" computer, may have a different notion of the available virtual address space. Similarly, the VMM also has a notion of the available virtual address space that is typically broader than that of the VM's, since the VMM is aware of the VM but not vice versa. Note that the VMM's concept of virtual address space may be the same the host OS's, but need not be.

For efficient performance of operations such as binary translation, the VMM should preferably be able to quickly access the virtual address space of the VM. In other words, given a virtual address VMM_VA in the VMM's virtual address space, the VMM should be able to determine quickly what corresponding guest (virtualized) physical address GPA or guest virtual address GVA the VM uses. The VMM therefore preferably includes a back-mapping table 446 for converting virtual addresses in the VMM's virtual space into guest physical addresses used by the VM. The conversion may be as simple as the following:

$$VMM\_VA = GUEST\_MEMORY\_BASE + GPA$$

where GUEST_MEMORY_BASE is the base address of the VM's virtual address space, which is known to the VMM.

When the VMM needs to access the VM's physical memory, the GPPN→PPN mapping must remain fixed. This is achieved by locking the machine page PPN from the host OS. Initially, no VM physical memory is locked; machine pages are locked and unlocked on demand.

Virtual Addressing Virtualization

The mapping of GVPN→GPPN may be derived using this mapping in the VM (which may also be maintained in the VMM if desired), followed by the GPPN→PPN mapping in the VMM. This creates a two-step GVPN→PPN mapping. This software translation follows exactly the same sequence as the hardware translation, albeit in two steps, which guarantees that the correct fault is raised to the VM when the translation fails.

The VMM uses the GPPN→PPN to create a TLB entry, which contains equal (or lesser) access rights to those specified by the guest. The entry is then inserted into the guest virtual hash page table (GVHPT), which is a long-format VHPT. The GVHPT is enabled when the guest runs in direct execution mode and TC mode.

The GVHPT caches the VM's TLB entries for all VM virtual address translations. When the VM accesses a virtual address, the hardware or the VMM interrupt handler loads the GVHPT entry into the hardware TLB. When the VM changes its TLB entry, the VMM makes corresponding changes to the hardware TLB and GVHPT. When the guest memory access causes a translation fault, the VMM resolves the fault by performing a software virtual address translation.

Region Register Virtualization

The contents of the VM's region registers are kept as a VMM data structure; the hardware region registers are then programmed using known methods to assist guest memory accesses. The VM's region registers are used for guest virtual address translation. Except for the region used by the VMM, each hardware region register preferably contains a shadowed RID of the corresponding guest RID.

If the guest RID is in use, that is, if it exists in the hardware region register, the GVHPT, or the hardware TLB, then the guest RID is active. For each active guest RID, the VMM preferably assigns a unique shadowed RID, which must be different from the RID of the VMM region.

When a new shadowed RID is allocated, the VMM preferably also ensures, using known methods, that the hardware TLB and the GVHPT do not contain entries for the RID. Upon a context switch to the host, all hardware TLB entries containing shadowed RIDs must be purged, although some RIDs may be preserved and used by the host, such as the RIDs of virtual address regions containing VMapp.

Direct Execution, Binary Translation, and Memory Accesses

As FIG. 6 illustrates, execution in different modes involves different memory regions. One mode—the direct execution mode—is described above and is well known in the art of virtualization: In the direct execution mode, the VMM passes VM instructions directly to the host hardware processor for execution, since they cannot affect any subsystem or access any memory, register, etc., that is off-limits to the VM. Direct execution is fast, because there is usually no need for intermediate processing in the VMM. The VMM therefore includes any known direct execution engine 460 to perform this function.

Binary translation is also mentioned above: A VM instruction (or instruction stream) cannot be allowed to execute as is for any of several reasons, for example, it attempts to access the VMM or host memory space, or assumes a privilege level higher than the user level the VM runs at. Although possible, the VMM preferably detects the need for binary translation not by examining each VM instruction before it is to be executed, but rather by detecting exceptions, interrupts, etc., that arise from attempted execution of instructions that cannot be directly executed. The VMM itself establishes many of the mechanisms used to generate these exceptions, for example, using memory tracing; other interrupts will be raised by the underlying system software.

In the binary translation mode, a binary translation engine 462 in the VMM checks a translation cache 463 to determine whether there is an existing translation of the instruction (or instruction stream) into a form that is "safe" to pass to the hardware processor for execution. If there is such a translation, then the translation is executed. If there is not yet a translation, for example, the first time the instruction is encountered, the first time it traps, etc., then the binary translation engine generates one.

Alternatively, the VM instruction (or stream) under consideration can be passed to a conventional interpreter 464, which generates a corresponding instruction stream that can be run directly. Note that interpretation is usually cheaper than binary translation in terms of processing cycles required, but that binary translation will be much faster if a translation already exists in the cache 463—the translation can be used more than once.

Note that both direct execution and binary translation involve accessing the guest (VM) memory region. Binary translation, however, also involves access to the VMM memory region, in which the cache 463 is located; indeed, execution of the binary translation engine 462 typically takes place entirely within the VMM region, although it may access the VM's region as needed. Interpretation will typically take place wholly within the VMM region.

The VMM is also defined by data and instructions that must be executed—the VMM is a set of computer instructions and related data just like the VM or, indeed, the host system software 200. Assume for example that the VMM is implemented as a program in the C language. When the VMM is executing, that is, when the system is in the "monitor mode," the VMM "program" will follow the well known C run-time conventions. Similar conventions will of course be followed if the VMM is written in some other language.

The two sections above explain features of a virtualized IA-64 system that define the problem solved by the invention: For the best performance, direct execution should be used as much as possible, but the VM should not be allowed to affect the VMM's memory region. On the other hand, the IA-64 lacks the segmentation scheme that is at present used (by VMware, Inc.) to protect the VMM from the VM.

VMM Virtual Addressing and Region Migration

As is mentioned above, the IA-64 virtual address space is divided into eight regions, which are indexed by the high three bits of the virtual address. At any given time, the VMM occupies one region, whereas the other regions refer to the regions of the virtual address space in which the VM operates. According to the invention, the VMM region is dynamically migrated from one region to another depending on how the guest uses the regions. As a result, in direct execution and binary translation modes, the VM always accesses memory using the original guest virtual address, but with no risk of affecting the memory region the VMM is currently assigned to. When running in direction execution, if the guest accesses the region occupied by the VMM, then an access rights fault causes the VMM to switch to another region. The way in which this is accomplished is described below.

When the VMM is running in translation cache mode, if the guest (VM) accesses the region occupied by the VMM, then the VMM detects this attempted region access (since all VM code is visible to the VMM) and the VMM switches itself to another region. The cost for performing region detection is very small—on IA-64 systems, the VMM implementation typically increases execution time by no more than 0–2 cycles per memory access.

In the monitor mode, the VMM accesses both the VMM memory and the VM's physical memory via the conventional hardware TLB and VHPT walker on the monitor page table. Some monitor features, such as the monitor area and monitor page table, are therefore always mapped to host memory, whereas the guest physical memory is preferably mapped on demand.

In the direct execution and binary translation modes, the VM accesses memory via the hardware VHPT walker on the guest VHPT (GVHPT). If the required address is not found in the GVHPT, then a TLB fault handler in the VM will map the corresponding page entry into GVHPT.

What is important to keep in mind is that the hardware TLB contains all region mappings (of which there may be more than one) but that the region identifiers (RIDs) determine which mapping to use. Also, the VMM is able to insert entries into the TLB, modify them (and therefore the mappings and region selection) and set the privilege levels associated with TLB entries. In particular, this means that the VMM can change the RIDs contained in the region registers, and therefore virtual address mappings.

Moreover, this also means that the VMM can set the TLB entries corresponding to its region at a higher protection level than the VM has valid access to. According to the invention, the VMM (or other higher-privilege but lower-preference sub-system), therefore sets the privilege level of its region higher than that of the VM's region(s). The VM will then fault on attempted access to the VMM's region, that is, the virtual-to-physical mapping in the TLB associated with the VMM, which causes a switch of execution to the VMM. The VMM (for example, the interrupt handler 450) thus detects the fault before any state change in the VM. Sensing the fault is then used to initiate the region relocation procedure described below, after which the VM is allowed to repeat the access, which will then not fault.

Although possible, it is preferable not to change the shadowed RID and the virtual address that the VM uses to access VM's memory because this would defeat the main purpose of this invention, which is to allow the VM to use unmodified virtual addresses, and thus eliminate the need for address remapping and allows the greatest use of direct execution.

VMM Region Switching

Figure 8:
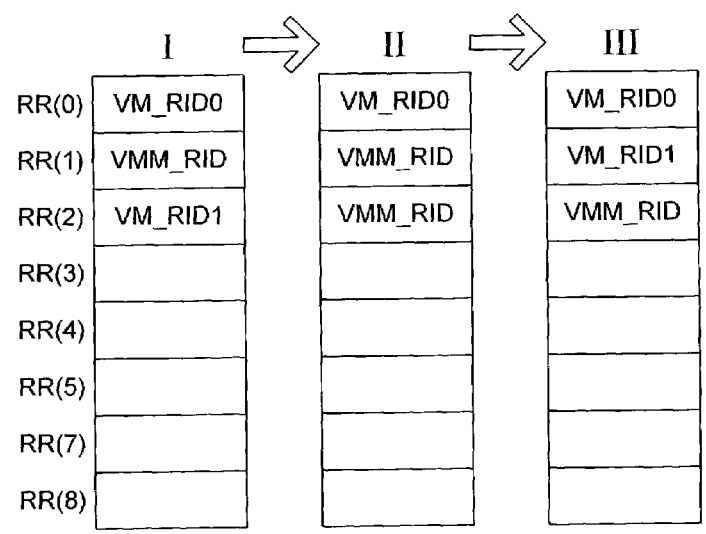
FIG. 8 shows an example of the way in which the contents of a memory region register change when the VMM memory region is switched to allow access to the region by a VM.

FIG. 8 illustrates the mechanism according to the preferred embodiment of the invention for changing the region of the VMM when the VM wishes to access the same region. Recall that the VMM can access and modify the region register 1002 (FIGS. 4 and 5). Consequently, the VMM can change its own region mapping, that is, the location of the RID pointer that is used to access the TLB for address translation. In short, the VMM can change its own region in the virtual address space while retaining its location in machine memory. The figure illustrates one example of an initial state (I), of an intermediate state (II) and of a final state (III) of the region register.

For purposes of this example, assume the following notation:

| | |
|---|---|
| init = | the memory region in which the VMM is initially located in virtual address space |
| dest = | the memory region to which the VMM is to be moved |
| RR(x) = | region register x |
| temp = | a temporary variable |
| base = | another temporary variable |
| rbase(k) = | the absolute address of the beginning of region k; in IA-64, for region k, $rbase(k) = 2^{61}*k$ |
| offset = | the distance in memory positions from init to dest |
| IP = | current instruction pointer value |
| L1, L2 = | address labels |

Assume without loss of generality that the VMM's RID (VMM_RID) is stored in RR(1) and that the VM, which may use the other seven regions, is currently actively using RR(0) (with contents VM_RID0) and RR(2) (with contents VM_RID1). This is state I.

Now assume further, also without loss of generality, that the VM issues an address with a VRN=1; in other words, the VM attempts to access RR(1), which would direct it into the VMM's address space, since that register contains VMM_RID. According to the invention, the VMM includes instructions (for example, in a region relocation module 466, FIG. 1) that implement the following pseudo-code:

| | Code | State/transition |
|---|---|---|
| | temp = RR(j) | I |
| | RR(j) = VMM_RID | II |
| | offset = rbase(j) − rbase(i) | |
| L1: | base = IP | |
| | base = base + offset + Δ | |
| | jump base | |
| L2: | RR(i) = temp | III | where
i = the index of RR the VM is attempting to access; here, i = 1
j = the index of the RR to which VMM_RID is to be moved; here, j = 2
Δ = (L2 − L1), which is a parameter that compensates for the inserted instructions.

The effect of this relocation operation is that the VRNs of VM-issued virtual addresses may be used directly to enter the set 1002 of region registers, which will then point to entries in the TLB in a region in the virtual address space that is assigned to the VM; the VMM region will be "safe," since, after relocation, a different VRN would be needed to have the region register point into the VMM's address space. The VMM will have been relocated in the virtual address space while retaining a fixed location in machine memory.

Because the region register in which the pointer to the VMM's region will have changed, the VRN used in VMM-issued addresses must also be changed to point to the new register. In other words, VMM addresses must change to reflect their relocation to a new region. One well-known way to ensure this is to design the VMM using relocatable code, that is, with addresses (and the instruction pointer) calculated relative to a given virtual address base. Changing the VRN of the base address to point to the beginning of a region then automatically changes the VRN (and thus region) of all VMM addresses. Another way to effectively change the VRN would be to include between the VMM and the region registers an intermediate mapping or conversion of the current VRN to the new VRN for VMM-issued addresses; this would, however, naturally introduce a delay that relocatable addressing avoids.

Although relocatable addressing is well known in the art of computer programming, consider the following example:

As input, let r1 contain the current monitor VRN {VRN: 0:0}; r2 be the offset of a particular memory address {0:VPN:offset}; and as output let r3 be the register to load the value from [r2]. The following instructions (in the C language) will then perform address relocation:

adds r4=r1, r2;;
ld8 r3=[r4]

The instruction pointer (IP) is also calculated by adding an offset to the current IP. During the region switch, the pseudo-code algorithm described above may be used. Afterwards, whenever the VMM needs to branch, relative addressing may also be used. Some examples follow:

EXAMPLE 1

IP-Relative Branch (with a 32 MB Relative Address Offset)

Let L1 be the source address and L2 be the destination address.

The following instructions perform the branch:
L1: br L2
. . .
L2:

where " . . . " indicates other, arbitrary non-branching instructions.

EXAMPLE 2

Indirect Branch (Over Whole Address Range)

L1: mov r1=ip;;
adds r1=r1, L2–L1;;
br r1
. . .
L2:

Note that it may be preferable in some implementations to encode certain performance-critical VMM sections using absolute addressing. If such addressing is used, then the VMM preferably switches its region back to the "original" region (the one indicated by the VRN of the absolute addresses) before entering these code sections. The VMM may then switch once again to the "relocated" region when execution returns to the VM.

In the example given above, the VMM virtual address space is relocated from region 1 to region 2. This is of course just by way of illustration. In practice, the VMM can relocate itself to any region other than the one currently being addressed by the VM. To reduce the frequency of relocation, the VMM could maintain statistics on the region access history of the VM and then relocate itself to a region that the VM has not accessed as frequently and/or as recently as others.

The example of region-swapping code shown above relates specifically to systems with the IA-64 architecture and was implemented in one prototype of the invention. Those skilled in the art of system-level programming will be able to adjust the algorithms for use with other hardware architectures. For example, some models of Intel Itanium processor use both VRN and RID to match an entry in the TLB, so it would be impossible to use the same TLB entry to translate the virtual addresses of different regions even if the RID and VPN are identical. The region-swapping code described above should then be modified so as to allocate a distinct monitor RID for each region. As long as these RIDs are not used by the VM, the same protection can be achieved. With this particular implementation, migrating the VMM region involves changing VMM_RID(1) to VMM_RID(2) in the example above.

In addition, in the example above, it is assumed that the entries for translating the code that performs the region migration exist in the hardware TLB so that no fault will occur. On IA-64 systems, this can be guaranteed by locking the TLB entries using translation registers, which is a common technique used in operating system software.

The description of the invention above refers to an example in which there are two sub-systems (a VMM and a VM) that share a common resource (the virtual memory space), where one of the sub-systems (the VM) is to be given "preference" in addressing the resource in order to improve its performance. The invention is not restricted to only two sub-systems. Instead, any number of sub-systems could be allowed to share the entire virtual memory space, with a hierarchy of preference. In practice, the number of sub-systems should not be greater than the number of regions so that each sub-system can be assigned to a corresponding region without overlap.

Let S2, S1, and S0 be three sub-systems, currently located in regions R2, R1, and R0, respectively. Assume that S2 is to be allowed the greatest degree of addressing freedom, for example, because it is the most performance critical, S1 has intermediate preference, and S0 has the lowest preference. If S2 wishes to address R1 then S1 will change its region (to some region other than S1 or S0) using the method described above. S0 will also switch regions if S2 addresses S0. Similarly, if S1 addresses R0, then S0 will switch to a region other than R0 or R2. In short, any sub-system with lower preference changes regions (in effect, getting "out of the way of") any sub-system with higher preference.

Note that, in this context, "preference" does not mean the same thing as "privilege." For example, in main example above, the VMM operates with greater privilege (at the system level) than the VM, but the VM is given preference in addressing in that the VMM switches region when the VM wishes to address the VMM region. The sub-system with greater privilege may be allowed to freely address the virtual memory space of less-privileged sub-systems (the VMM can address the VM's regions without any need for region migration). If a sub-system of lower preference also has no greater privilege, or the sub-systems are to remain isolated for some other reason, then any attempt by a sub-system with less preference to address the region of a sub-system with higher preference can be handle either by forcing the lower-preference sub-system to wait, or by performing an intermediate remapping of its addresses.

The number of sub-systems and the number of virtual memory regions each occupies may therefore be arbitrary, with the following constraints: First, no sub-system should ever need to access all regions in order for its execution to proceed. Second, the sub-system(s) that have lower preference should be able to switch regions upon demand; consequently, at least when the region switch is required and when it is in effect, the region-switched sub-system must be running in relocatable code. Finally, the sub-system(s) to be switched (for example, the VMM) should have a higher privilege level than the sub-system that is to be allowed "unswitched" addressing (for example, the VM) in order to protect it/themselves from the unswitched sub-system.

What is claimed is:

1. In a computer system that has at least two sub-systems that share a resource, access to which is through addressing a non-segmented address space that is divided into regions, a method for sharing the resource comprising:

upon attempted addressing by a first one of the subsystems of a region currently occupied by a second one of the subsystems, relocating the second sub-system to a different region and thereafter allowing the first sub-system to directly address the region that was occupied by the second subsystem before the second sub-system was relocated.

2. A method as in claim 1, in which:
the resource is physical memory that has a physical address space;
access to the physical memory is through addressing a virtual address space, with virtual addresses being converted to physical addresses;
the virtual address space is divided into the regions;
each virtual address includes a region-identifying portion; and
the step of relocating the second subsystem to a different region comprises changing the region-identifying portion of addresses issued by the second sub-system.

3. A method as in claim 2, in which:
the region-identifying portion of each virtual address points to one of a set of region registers;
the contents of each used region register is region identifier that points into a virtual-to-physical address map; and
the step of relocating the second subsystem to a different region further comprises loading into a different region register the region identifier pointing to the mapping in the virtual-to-physical address map corresponding to the virtual region of the second sub-system and changing the region-identifying portion of addresses issued by the second sub-system to point to the different region register.

4. A method as in claim 3, in which the virtual-to-physical address map is a translation look-aside buffer (TLB).

5. A method as in claim 3, further comprising encoding all but critical instructions of the second sub-system using relocatable code defined relative to an address base, in which the step of changing the region-identifying portion of addresses issued by the second sub-system comprises changing the address base to be the beginning of a region.

6. A method as in claim 3, in which the second sub-system is a virtual machine monitor and the first sub-system is a virtual machine running on the virtual machine monitor.

7. A method as in claim 3, further including the following steps:
setting entries in the virtual-to-physical address map corresponding to the second sub-system's region to a higher privilege level than the privilege level of entries corresponding to any region of the first sub-system, whereby any attempted access by the first sub-system to higher-privilege entries of the second sub-system causes a fault;
sensing, by detecting the fault, attempted addressing by the first sub-system of the region currently occupied by the second sub-system; and
initiating the stop of relocating the second sub-system to a different region upon detecting the fault and before the first subsystem alters its own state.

8. A method as in claim 2, in which the computer system has an Intel 64-bit architecture.

9. A method as in claim 1, in which the resource is a profiler.

10. In a computer system that has a non-segmented virtual address space that is divided into regions, a map of the virtual address space to a physical address space of a memory, a virtual machine monitor (VMM) running on a host platform and a virtual machine (VM) running on the VMM, in which each virtual address includes a region-identifying portion that points to one of a set of region registers; and the contents of each used region register is a region identifier that points into the virtual-to-physical address map;
a method for sharing the virtual address space comprising:
setting entries in the virtual-to-physical address map corresponding to the VMM's region to a higher privilege level than the privilege level of entries corresponding to any region of the VM, whereby any attempted access by the VM to higher-privilege entries of the VMM causes a fault;
sensing, by detecting the fault, attempted addressing by the VM of the region currently occupied by the VMM; and
upon detecting the fault, relocating the VMM to a different region in the virtual address space by loading into a different region register the region identifier pointing to the mapping in the virtual-to-physical address map corresponding to the virtual region of the VMM and changing the region-identifying portion of addresses issued by the VMM to point to the different region register.

11. A method as in claim 10, in which the step of relocating the VMM to a different region comprises by changing the region-identifying portion of addresses issued by the VMM.

12. A computer system comprising:
a resource, access to which is through addressing a non-segmented address space that is divided into regions;
at least a first and a second sub-system that share the resource;
a computer program executing on the computer, wherein the computer program comprises computer instructions for detecting attempted addressing by the first sub-system of a region of the currently occupied by the second sub-systems and for relocating the second sub-system to a different region.

13. A system as in claim 12, in which:
the resource is physical memory that has a physical address space;
access to the physical memory is through addressing a virtual address space, with virtual addresses being converted to physical addresses;
the virtual address space is divided into the regions;
each virtual address includes a region-identifying portion; and
the computer program further comprises computer instructions for relocating the second sub-system to a different region by changing the region-identifying portion of addresses issued by the second sub-system.

14. A system as in claim 13, further comprising a set of region registers, and in which:
the contents of each used region register is a region identifier that points into a virtual-to-physical address map:
the region-identifying portion of each virtual address points to one of a set of region registers; and
the computer program further comprises computer instructions for relocating the second sub-system to a different region by loading into a different region register the region identifier pointing to the mapping in the virtual-to-physical address map corresponding to the virtual region of the second sub-system and changing the region-identifying portion of addresses issued by the second sub-system to point to the different region register.

15. A system as in claim 14, in which the virtual-to-physical address map is a translation look-aside buffer (TLB).

16. A system as in claim 14, in which the second sub-system is a virtual machine monitor and the first sub-system is a virtual machine running on the virtual machine monitor.

17. A system as in claim 14, in which:
the second sub-system includes further computer instructions for setting entries in the virtual-to-physical address map corresponding to the second sub-system's region to a higher privilege level than the privilege level of entries corresponding to any region of the first sub-system, whereby any attempted access by the first sub-system to higher-privilege entries of the second sub-system causes a fault;
the second sub-system includes an interrupt handler that senses, by detecting the fault, attempted addressing by the first sub-system of the region currently occupied by the second sub-system; and
the second subsystem initiating relocating to a different region upon detection of the fault and before the first sub-system alters its own state.

18. A system as in claim 13, in which the computer system has an Intel 64-bit architecture.

19. A system as in claim 12, In which the resource is a profiler.

20. A computer system comprising:
a host platform;
a physical memory having a physical address space;
a non-segmented virtual address space that is divided into regions,
a map having entries mapping addresses in the virtual address space to addresses in the physical address space, as well as a privilege level for each entry;
a set of region registers, each used region register containing a region identifier that points into the virtual-to-physical address map and each virtual address in the virtual address space including a region-identifying portion that points to one of the set of region registers;
a virtual machine monitor (VMM) running on the host platform;
a virtual machine (VM) running on the VMM;
an interrupt handler that senses any faults caused by the VM issuing addresses in the virtual address space;
a computer program including computer instructions:
for setting entries in the virtual-to-physical address map corresponding to the VMM's region to a higher privilege level than the privilege level of entries corresponding to any region of the VM, whereby any attempted access by the VM to higher-privilege entries of the VMM causes a fault; and
upon detecting the fault, for relocating the VMM to a different region in the virtual address space by loading into a different region register the region identifier pointing to the mapping in the virtual-to-physical address map corresponding to the virtual region of the VMM and changing the region-identifying portion of addresses issued by the VMM to point to the different region register.

* * * * *